United States Patent [19]

Wetmore

[11] 4,355,589

[45] Oct. 26, 1982

[54] FERTILIZER APPLICATOR KNIFE ASSEMBLY

[75] Inventor: Halsey J. Wetmore, Guymon, Okla.

[73] Assignee: Adams Hard-Facing Company, Inc., Guymon, Okla.

[21] Appl. No.: 244,037

[22] Filed: Mar. 16, 1981

[51] Int. Cl.³ .............................................. A01C 23/02
[52] U.S. Cl. ........................................ 111/7; 172/699
[58] Field of Search ................... 111/6, 7, 86; 172/699

[56] References Cited

U.S. PATENT DOCUMENTS

| | | | |
|---|---|---|---|
| 2,598,121 | 5/1952 | Hannibal | 111/7 |
| 2,904,119 | 9/1959 | Hunter | 111/7 X |
| 2,924,187 | 2/1960 | Zimmerman | 111/7 |
| 3,092,052 | 6/1963 | Andersen | 172/762 |
| 3,188,989 | 6/1965 | Johnston | 111/86 X |
| 3,259,087 | 7/1966 | Horton | 111/7 |
| 3,854,429 | 12/1974 | Blair | 111/86 |
| 4,132,181 | 1/1979 | Smith | 172/719 |
| 4,201,142 | 5/1980 | Stump | 172/699 |

OTHER PUBLICATIONS

Adams Hard-Facing Company, Inc.-NH3 Knife-AA6, Jan. 1, 1979.

Primary Examiner—Richard J. Johnson
Attorney, Agent, or Firm—William R. Laney

[57] ABSTRACT

A fertilizer applicator knife assembly which includes a shank having a leading edge and a trailing edge, an earth cutting wear insert mounted on the leading edge of the blade shank, an elongated fertilizer tube secured at spaced intervals to the trailing edge of the shank and including an end secured to the shank near one end thereof and on the opposite side of the shank from the wear insert, and a tube protective spacer inserted between the tube and shank adjacent the end of the tube secured to the shank, and receiving the tube in a slot formed therein extending parallel to the axis of the tube.

9 Claims, 2 Drawing Figures

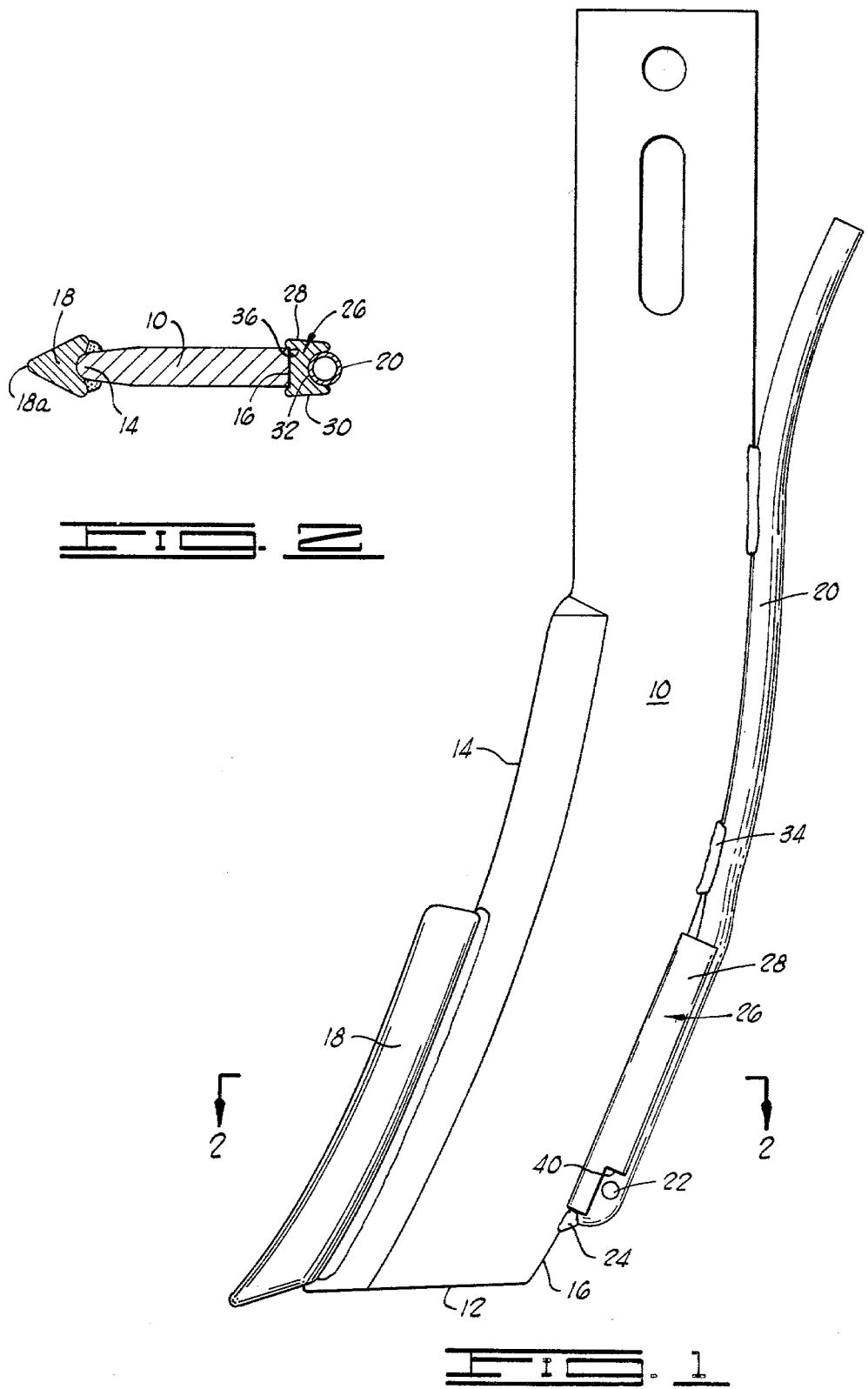

FERTILIZER APPLICATOR KNIFE ASSEMBLY

BACKGROUND OF THE INVENTION

1. Field of the Invention

This invention relates to agricultural implements used to apply fertilizer to a sub-soil location, and more particularly, to an applicator knife for placing a fluid fertilizer, such as anhydrous ammonia, in a furrow or trench as it is formed.

2. Brief Description of the Prior Art

The use of liquid and gaseous fertilizer materials for enhancing the productivity of soils is a widespread agricultural practice. One of the most widely used fertilizer compositions employed is anhydrous ammonia. This highly nitrogeneous fertilizer is applied to the soil by delivering it as a fluid through an elongated tube which extends down the rear side of a knife utilized to form a furrow or trench in the soil as a series of such knives carried on a tractor-mounted implement are moved forward through the soil. In the described arrangement, the fertilizer tube is partially protected by its position on the rear or trailing side of the knife blade shank, but extended usage of the fertilizer applicator blade and its associated fertilizer delivery tube results in severe wear of both the blade and the tube, with the requirement that the badly abraded tube be frequently replaced.

The method by which the tube has been secured to the rear or trailing edge of the blade shank in prior arrangements of the type described has been by welding the tube to the blade shank at spaced points therealong. Frequently, a hard weld metal is used in a continuous bead between the shank and the lower end of the tube in order to afford some further protection to the tube against vibration and excessive wear, and a build-up of this weld metal has also been employed in some instances to cut down the heat transfer between the blade shank and the tube. The passage of the anhydrous ammonia through the tube to the point of discharge at the lower end thereof has the effect of quite substantially cooling the metal of which the tube is made. As contrasted with this, the blade shank, in cutting through the soil, becomes heated. This temperature differential tends to develop stresses at the interface between the tube and the blade shank. Accordingly, the build-up of weld metal has been undertaken for the purpose of reducing the heat transfer temperature differential between the blade shank and the tube, and thus reduce destructive thermal stresses in the assembly.

Brochures of a typical prior arrangement, as manufactured and sold by applicant's assignee, are submitted with the prior art statement which is filed concurrently with the present application.

BRIEF DESCRIPTION OF THE PRESENT INVENTION

The present invention comprises a fertilizer applicator knife assembly which includes a curved blade shank having a leading edge and a trailing edge, an earth cutting wear insert mounted on the leading edge of the blade shank and an elongated fertilizer tube secured to the trailing edge of the blade shank. The fertilizer tube is secured at spaced intervals to the trailing edge of the blade shank, and is spaced from the trailing edge of the blade shank between points of tube securement by means of a wear insert made of very hard metal which is inserted between the tube and the trailing edge of the blade shank at a location adjacent the lower end of the tube. The protective spacer has a slot formed in one side thereof, with the slot extending substantially parallel to the axis of the fertilizer tube and receiving the tube in the slot. The protective spacer is dimensioned to protect the tube from frictional wear resulting from contact with the earth as the knife assembly is forced through the earth during the application of fertilizer.

An important object of the invention is to provide a fertilizer applicator knife assembly which is characterized in having improved wear characteristics with respect to generally similar types of assemblies heretofore manufactured and sold.

A further object of the invention is to provide a fertilizer applicator knife assembly which effectively reduces the path of thermal conductivity between a cold fertilizer dispensing tube and the applicator blade shank.

A more specific object of the invention is to provide a fertilizer applicator knife assembly of the type which includes an elongated tube for delivering a fluid fertilizer to the soil adjacent a blade element of the knife assembly, which tube is protected during utilization of the knife assembly and therefore has an exceptionally long service life obviating the need for replacement of the tube at frequent intervals.

Additional objects and advantages of the invention will become apparent as the following detailed description of a preferred embodiment of the invention is read in conjunction with the accompanying drawings which illustrate such preferred embodiment.

GENERAL DESCRIPTION OF THE DRAWINGS

FIG. 1 is a side elevation view of the knife assembly of the invention.

FIG. 2 is a sectional view taken along line 2—2 of FIG. 1.

DETAILED DESCRIPTION OF A PREFERRED EMBODIMENT OF THE INVENTION

The knife assembly of the invention includes an elongated blade shank 10 which has a foot 12 at its lower end. The blade shank is in the form of a flat plate having a leading edge 14 and a trailing edge 16. Adjacent the foot 12 of the shank 10, a hard metal wear insert 18 is welded to the leading edge 14 of the shank. Both the insert 18 and the weld metal employed to weld it to the shank 10 are preferably very hard and abrasion-resistant metal, such as chromium carbide. As shown in FIG. 2, the wear insert is beveled or tapered to a relatively narrow edge 18a adjacent its leading edge to provide a cutting action as the knife assembly is forced through the soil during application of the fertilizer.

Extending down the trailing edge 16 of the blade shank 10 from a tank or other source (not shown) carried on a tractor upon which the implement provided with the knife assemblies is carried is an elongated fertilizer tube 20. The fertilizer tube 20 is a hollow tube used to convey the fluid fertilizer to a point adjacent the foot 12 of the shank 10. At its lower end the tube 20 is provided with a pair of opposed lateral discharge holes 22 through which the fertilizer is discharged to the surrounding soil. The bottom of the tube below these holes is closed. At its lower end, the tube 20 is secured to the trailing edge 16 of the shank 10 by a weld 24. The lower end of the tube at the point at which it is welded to the shank 10 is adjacent the foot 12 of the shank.

In order to protect the tube 20 from abrasive wear and shock forces developed from impact with rocks, roots or other objects in the soil, a protective spacer is employed and is designated generally by reference numeral 26 in the drawings. The protective spacer 26 is an elongated bar of very hard metal, and has a generally rectangular cross-section as shown in FIG. 2. The protective spacer has a pair of tapering or inclined opposed side surfaces 28 and 30 which extend from the forward side of the spacer to the rear side thereof.

At the rear side of the spacer 26, the spacer has formed therein an elongated groove 32. As illustrated in FIG. 1, the tube 20 is bent back from its point of attachment through the weld metal 24 to the shank 10 across the rear side of the spacer 26 so that the tube lies in and occupies the elongated groove 32. As shown in FIG. 2, the groove 32 is dimensioned to receive the tube 20 so that the spacer 26 extends at least over approximately 180° of the total circumference of the tube, and thus protects the tube from abrasion by soil particles moving past the tube as the applicator blade is forced forward through the earth. After passing across the spacer 26 in the groove 32, the tube 20 is bent back toward the shank 10 and is welded to the trailing edge 16 of the shank by the use of hard weld metal at a point 34 therealong as shown in FIG. 2. The result of this securement of the tube 20 to the shank 10 in this fashion is to wedge or force the spacer 26 into contact with the trailing edge 16 of the blade shank 10 so that the spacer is trapped between the tube and blade shank.

The spacer 26, at its forward side, is provided with a rectangular relief or recess 36 which is dimensioned to accept the trailing edge 16 of the blade shank 10 as shown in FIG. 2. Again, it will be noted that this structure of the spacer 26 results in the side portions of the spacer overlapping the sides of the blade shank 10 so that soil tending to move rearwardly along the opposite faces of the blade shank toward the trailing edge thereof is diverted outwardly by the overlapping portions of the spacer.

Adjacent the lower end of the spacer 26, each of the sides 28 and 30 of the spacer is relieved by the formation of a rectangular notch 40 in the spacer. The rectangular notches 40 formed in the opposite sides of the lower end of the spacer 26 expose the lateral discharge holes 22 in the tube 20 to facilitate the discharge of fluid fertilizer from the tube. At the same time, the configuration of the notches 40 functions to protect the discharge openings 20, both from ahead and above, from soil compaction and plugging.

The fertilizer applicator knife assembly of the invention is marked by its unusually long and trouble-free service life. The provision of the hard metal insert 18 at the leading edge of the blade shank 10 minimizes wear on the blade shank, and the use of the protective spacer 26 assures that that portion of the fertilizer delivery tube 20 which is ordinarily subjected to the most wear and stress during use of the implement will be protected from abrasive wear and mechanical distortion. Moreover, the protective spacer helps reduce the propensity for the development of stress cracking due to high thermal differentials between the fertilizer tube and the blade shank. Finally, if the requirement arises, the protective spacer 26 can itself be quickly and easily replaced by a new spacer without the necessity for complete removal and replacement of the tube 20.

Although a preferred embodiment of the invention has been herein described in order to provide a lucid explanation of the basic principles which underlie the invention, it will be perceived that various changes and innovations in the illustrated and described structure can be made therein without departure from these basic underlying principles. Changes and innovations of this type are therefore deemed to be circumscribed by the spirit and scope of the invention except as the same may be necessarily limited by the appended claims or reasonable equivalents thereof.

What is claimed is:

1. A fertilizer applicator knife assembly comprising:
a shank having a leading edge, a trailing edge and a foot;
an earth-cutting wear insert mounted on the leading edge of the blade shank;
an elongated fertilizer tube secured at spaced intervals to the trailing edge of the shank; and
a tube protective spacer removably inserted and wedged between the tube and shank at a location between points of securement of the tube to the shank trailing edge, said tube protective spacer being unsecured to said shank and unsecured to said tube to facilitate removal thereof from between said shank and said tube, said spacer being an elongated metal block having a generally rectangular cross section, a front, a back, and two sides.

2. A fertilizer applicator knife assembly as defined in claim 1 wherein said wear insert and protective spacer are constructed of chromium carbide metal.

3. A fertilizer applicator knife assembly comprising:
a shank having a leading edge, a trailing edge and a foot;
an elongated fertilizer tube secured at spaced intervals to the trailing edge of the shank; and
an elongated tube protective spacer removably inserted between the tube and shank at a location between points of securement of the tube to the trailing edge, said spacer being an elongated metal block having a generally rectangular cross-section, a front, a back and two sides, and further characterized in having a groove in the back thereof receiving said tube, and in having a recess in the front thereof fitted over and receiving the trailing edge of the shank.

4. A fertilizer applicator knife assembly comprising:
a shank having a leading edge, a trailing edge and a foot;
an earth-cutting wear insert mounted on the leading edge of the blade shank;
an elongated fertilizer tube secured at spaced intervals to the trailing edge of the shank; and
a tube protective spacer inserted between the tube and shank at a location between points of securement of the tube to the trailing edge, said tube protective spacer being an elongated metal block having a generally rectangular cross section, a front, a back and two sides, and further characterized in having a groove in the back thereof receiving a portion of said fertilizer tube and extending substantially parallel to the axis of said fertilizer tube.

5. A fertilizer applicator knife assembly as defined in claim 4 wherein said tube protective spacer is further characterized in having a recess in the front thereof fitted over and receiving the trailing edge of the shank, and wherein said tube protective spacer is removably mounted between said fertilizer tube and said shank.

6. A fertilizer applicator knife assembly as defined in claim 4 wherein said tube includes:
- a closed lower end adjacent the foot of the shank; and
- a pair of lateral fertilizer discharge openings on opposite sides of the tube adjacent the lower end thereof; and
- wherein the sides of said spacer are notched adjacent one end of said spacer at a location to avoid obstruction of said lateral discharge openings.

7. A fertilizer applicator knife assembly as defined in claim 4 wherein the spacer sides project around said tube to locations equivalent to at least half the circumference of the tube.

8. A fertilizer applicator knife assembly as defined in claim 7 wherein said tube includes:
- a closed lower end adjacent the foot of the shank; and
- a pair of lateral fertilizer discharge openings on opposite sides of the tube adjacent the lower end thereof; and
- wherein the sides of said spacer are notched adjacent one end of said spacer at a location to avoid obstruction of said lateral discharge openings.

9. A fertilizer applicator knife assembly as defined in claim 8 wherein said wear insert and protective spacer are constructed of chromium carbide metal.

* * * * *